United States Patent Office 3,066,453
Patented Dec. 4, 1962

3,066,453
MANUFACTURE OF GLASS
Gerald E. Kunkle, New Kensington, and William C. Harrell, Arnold, Pa., assignors to Pittsburgh Plate Glass Company, Allegheny County, Pa., a corporation of Pennsylvania
Filed Nov. 25, 1959, Ser. No. 855,329
16 Claims. (Cl. 51—110)

This invention relates to the manufacture of glass and particularly to the surfacing of plate glass, especially the procedure known as polishing wherein ground plate glass is subjected to a rubbing action with fine abrasives.

In the production of ground and polished plate glass, glass is generally formed into a ribbon by passing or flowing molten glass through forming rolls. The forming rolls are usually knurled on their surfaces, so as to produce a product known as rough rolled glass. The rough rolled glass is annealed to remove stresses and strains and is then subjected to a rubbing action with a coarse abrasive such as sand to produce what is known as a smooth. The grinding operation removes the pattern impressed in the ribbon of glass by the knurls of the forming rolls and also removes surface portions of the glass, so that the opposing surfaces are substantially plane and parallel with one another. The smooth produced by the grinding operation is somewhat opaque, the appearance being that typical of ground glass. To give the glass the transparency generally associated with plate glass, the smooth is polished by rubbing the surfaces with a fine abrasive, as for example a mixture of rouge, copperas and water.

One conventional form of glass polishing apparatus includes at least one circular spider driven from a prime mover and having a plurality of circular polishing blocks or runners journaled for free rotation about axes disposed around the periphery of the spider. There may be more than one of these devices positioned transversely of the path through which the smooth is conveyed, generally on tables. Each polishing block or runner is provided with a facing, generally of felt, for rubbing contact with the surfaces of the smooth.

The glass to be polished is supported by its lower surface resting on the polishing tables, so that its upper surface is contacted by the polishing apparatus. After one surface is polished, the glass is then turned over so as to polish the other surface.

It is desirable to uniformly polish the surfaces of the smooth, that is, to uniformly remove glass from the surfaces, so that the resulting surfaces will be plane, parallel to one another and also uniform with respect to removal of surface defects residual in the smooth. Thus, it is desirable to have a uniform polishing effect, and to produce a uniform, high quality product.

The above-described conventional polishing apparatus does not uniformly polish glass transversely across its width although there is substantially uniform pressure between the polishing apparatus and the glass being contacted thereby. Thus, certain areas of the glass surfaces are polished differently than other areas; i.e., the amount of glass removed by polishing differs in areas or regions of the glass. It has been found that these areas generally occur in bands extending longitudinally of the glass, i.e., in areas substantially parallel to the path traversed by the glass through the polishing apparatus.

The non-uniformity in the different areas affects the quality of the ground and polished plate glass, which is graded into three qualities, generally known as mirror, glazing, and total reject. The total reject glass is generally relegated to cullet for inclusion in subsequent glass batch. As will be obvious to one skilled in the art, it is desirable to obtain the greatest yield in mirror quality glass because this grade brings the highest price on the market.

It has been discovered that it is possible to correct the non-uniform polishing effect and thus provide plate glass of substantially uniform polish. According to this invention, this is accomplished by selectively applying varying force to the lower surface of the glass, in an area opposite to or below that of the upper surface wherein the polishing effect is different to vary the contact pressure between the polishing means and the glass. By so doing the contact pressure between the polishing means and the glass is varied or modified and substantially uniform polishing of the glass can be effected.

It has been found also that in using the invention herein described and claimed, not only can a substantially uniform quality product be obtained, but, unexpectedly, the speed by which the product is manufactured can be materially increased, thus reducing the cost of the manufacturing operation.

The invention will be further described with reference to the following drawings which form a part of the disclosure, and in which:

FIG. 4 is a partial exploded perspective view of one embodiment of the invention as applied to a glass sheet supporting means; and FIG. 5 is a partial perspective view of another embodiment of this invention.

Figure 1:
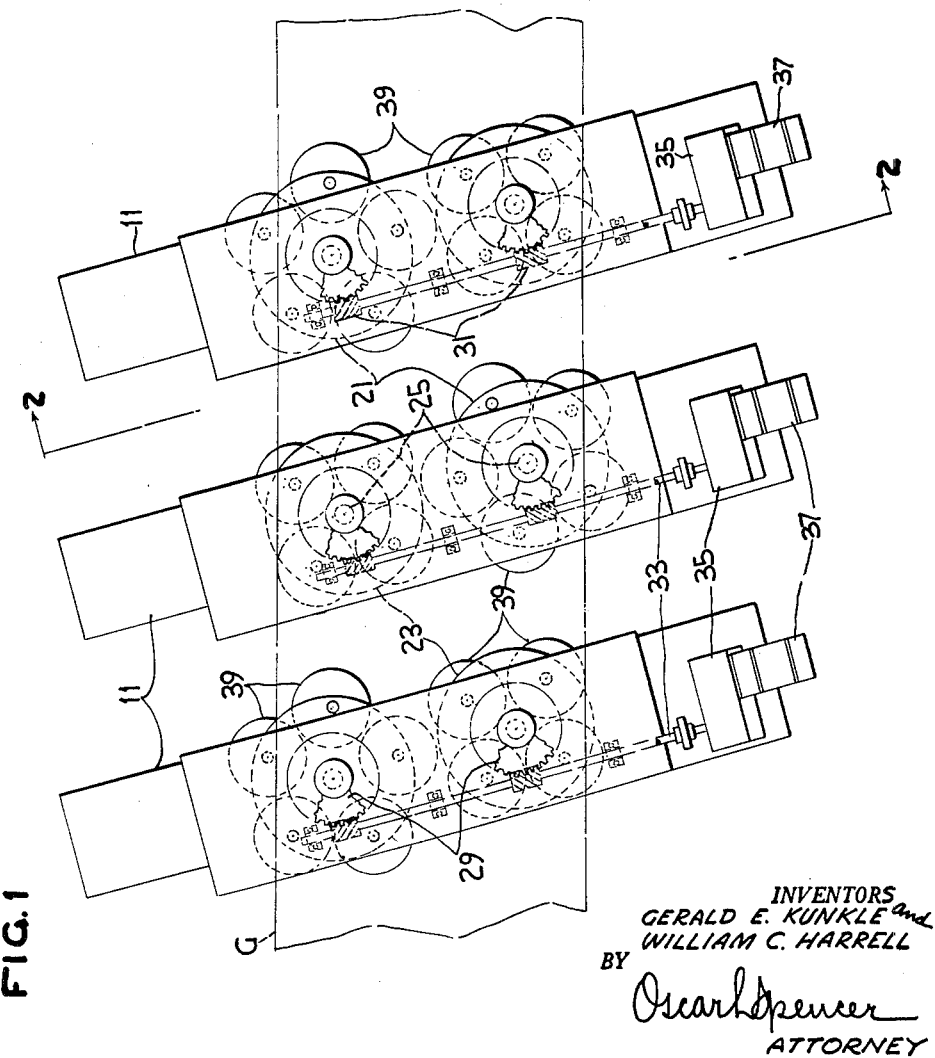
FIG. 1 is a plan view of a typical conventional glass polishing apparatus, showing the polishing runners disposed transversely of the glass.
Figure 2:
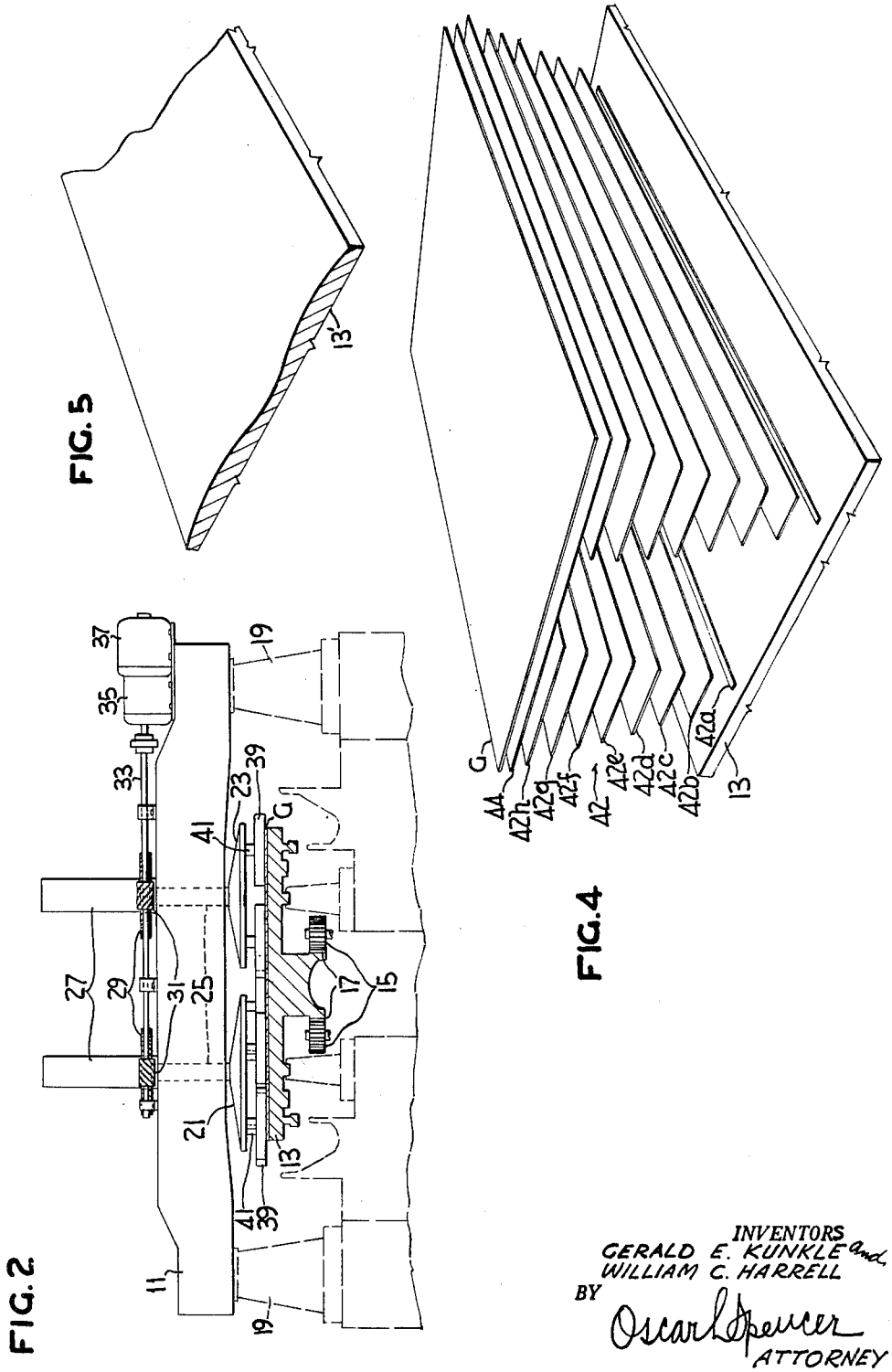
FIG. 2 is a view taken on line 2—2 of FIG. 1 showing the supporting means for the glass and the polishing runners with parts in phantom.

Referring to the drawings, and especially FIGS. 1 and 2, there is illustrated a portion of a polishing line which includes a plurality of bridges 11 (three of which are shown) spanning the path traversed by glass sheets G carried upon tables 13 propelled through the line. The propelling force for the tables 13 is provided by pinions 15 driven from a suitable prime mover (not shown) which mesh with racks 17 connected or formed on the lower portion of each table 13.

Each bridge 11 is supported by upright pillars 19 and each carries a pair of spaced polishing spiders 21 and 23. Each of the spiders is attached to the lower terminus of a shaft 25 journaled in suitable bearings (not shown) carried by the bridge 11 and within housings 27. A gear 29 is fixed to each shaft 25 and each meshes with a worm 31 fixed to a drive shaft 33 journaled at spaced locations along the bridge and connected through a reduction gearing arrangement indicated at 35 to a prime mover 37 supported on the bridge. Thus both spiders carried by a bridge are driven by the same prime mover.

Each spider 21 has five polishing blocks 39 connected thereto and each spider 23 has four polishing blocks connected thereto. It will be noted, see especially FIG. 1, that the arrangement of the four and five block spiders alternates at adjacent bridges. Each polishing block 39 is fixed to the lower end of a shaft 41 journaled for free rotation in suitable bearings carried by its spider, either 21 or 23, and a polishing pad, preferably of a fibrous material, such as felt, is attached to the lower surface of each block 39 for rubbing contact with the upper surface of the glass G.

The apparatus just described is conventional in construction and is for the purpose of illustration only, the invention herein disclosed being applicable to other and differing glass polishing constructions.

Figure 3:
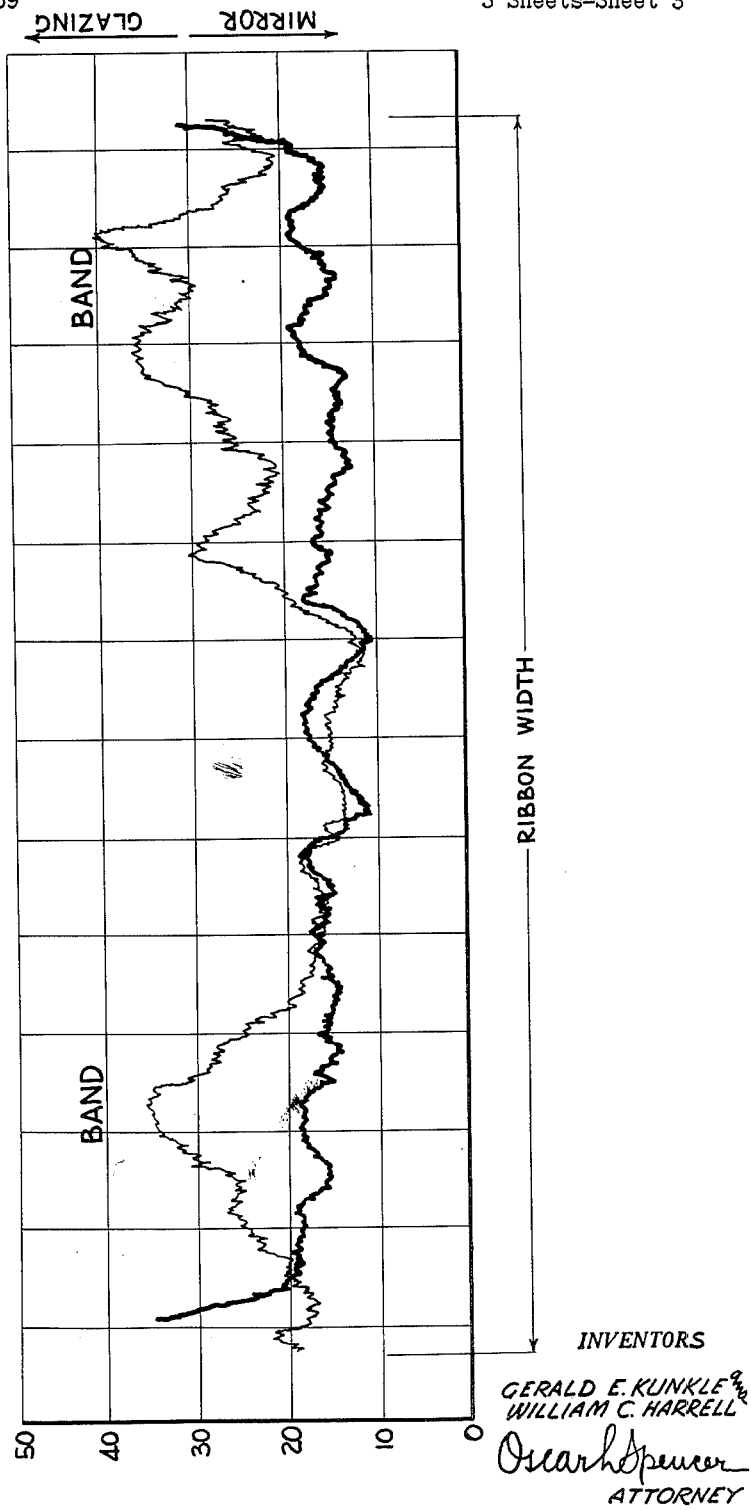
FIG. 3 shows graphically the finish of glass polished using the apparatus depicted in FIGS. 1 and 2, the ordinates representing glass finish quality with the heavier curve representing the quality of glass using the principles of this invention and the lighter curve representing the quality of the glass without using the principles of this invention.

The finish quality of glass polished with and without the teachings of this invention is graphically shown in FIG. 3 wherein the lighter of the curves represent the finish quality without using this invention and the heavier of the curves represent the finish quality using the principles of this invention. The ordinates of these curves represent readings of a meter or other indicating device connected to an optical instrument for evaluating surface finish. These readings are taken across the sheet, i.e., substantially perpendicular to the path traversed by the sheet through the polishers. Note that substantially the entire sheet falls within mirror—the highest quality—glass when using the principles of this invention, while there are band areas falling within glazing quality without the use of this invention.

In accordance with the invention herein disclosed, use may be made of shims disposed between the upper surface of the tables 13 and the glass G. Such a construction is illustrated in FIG. 4, wherein there is shown the table 13, having a substantially plane surface, a pair of spaced shims, generally identified as 42, the glass G and, also, a cloth covering 44 upon which the glass G rests on the table. The cloth covering of the tables provides for frictionally engaging the glass and retaining it in position on the tables and is used in lieu of plaster of Paris as in other polishing apparatus. The cloth covering, however, is conventional and forms no part of this invention.

Each of the shims 42 is in the form of an inverted pyramid constructed of a plurality of different widths of material, such as kraft paper, aluminum foil, or film of "Mylar" (a polyester which is a condensation product of ethylene glycol and terephthalic acid) extending longitudinally of the table. In FIG. 5, there are illustrated eight strips of material 42a, 42b, 42c, 42d, 42e, 42f, 42g and 42h in each shim 42, with the narrow strip 42a on the table and progressing upwardly in wider strips to the maximum width strip 42h adjacent the cloth covering 44. These strips are cemented or otherwise adhered to each other and to the table to present a smooth convex surface, and are positioned in the longitudinal band areas where the finish is the poorest. Looking at FIG. 4, for the polishers depicted herein, the shims are placed in positions corresponding to those identified as "Bands" and they apply the varying forces described in a selected glass area.

The table, as will be noted (see FIG. 2) which is conventional in construction, has a continuous supporting surface which is planar and has associated with the planar surface thereof shims or other suitable means for varying the forces applied in an area of the surface of a glass sheet opposed to the surface thereof to which a polishing means is applied. In this manner the contour of the surface of the glass sheet in contact with the polishing means is modified to control the contact pressure between the polishing means and the surface of the glass sheet.

Another modification of this invention is illustrated in FIG. 5 which shows a fragmentary portion of a polishing table, herein identified as 13'. The top of this table which supports the glass sheets for polishing is contoured, so as to present longitudinally extending convex surface portions corresponding to the "Band" areas of the curve shown in the lighter lines in FIG. 3.

The ability to increase the speed of production of a substantially uniform, high quality product by the use of this invention is probably due to the fact that the finish imparted by the polishing runners across the glass sheet is rendered uniform in all areas of the traverse, particularly when compared to non-uniform finish exerted in prior art methods. In other words, instead of overpolishing portions of the ribbon and underpolishing other portions, the polishing effect of the first mentioned portion is reduced, and that on the second mentioned portion is increased. However, the ultimate quality of the previously overpolished portion remains the same.

With respect to the increase in speed, in actual practice, it has been possible to increase the polishing line speed by approximately 23% and produce the highest quality plate glass—mirror quality—over substantially the entire sheet. This has amounted to approximately a 50% increase in mirror quality glass over that previously produced.

Because the above percentages are for the depicted polishing apparatus, it is to be understood that they probably will vary for other constructions; however, similar increases in production speed and quality will occur when using this invention.

It is to be understood that other adaptations of this invention may be employed, as apparent to one skilled in the art. For example, laminated fiber glass, contoured felt, contoured table cloths, and sprayed metal or plastic shims can be used. Also, the entire surface of the table can be covered with a properly contoured plate, sheet or the like.

We claim:

1. In a method of polishing glass with a polishing means making surface contact with the glass as the glass moves along a linear path, said polishing means being characterized by a polishing effect which is different in at least one area of glass surface contact than in other areas of glass surface contact, and wherein the glass is supported by its lower surface as it moves along said path with its upper surface disposed for contact by said polishing means, the improvement which comprises, selectively applying varying forces to an area of said lower surface opposite to an area of said upper surface in which the polishing effect of said polishing means is different to thereby vary the pressure between said polishing means and said glass in said last-named area, and then contacting said moving and so supported glass with said polishing means to thereby polish said glass substantially uniformly over its entire surface area.

2. In a method of polishing glass with a polishing means making surface contact with the glass as the glass moves along a linear path, said polishing means being characterized by a polishing effect which is different in at least one longitudinally extending area of glass surface contact than in other areas of glass surface contact, and wherein the glass is supported by its lower surface as it moves along said path with its upper surface disposed for contact by said polishing means, the improvement which comprises selectively applying varying forces to a longitudinally extending area of said lower surface opposite to a corresponding area of said upper surface in which the polishing effect of said polishing means is different to thereby vary the pressure between said polishing means and said glass in said last-named area, and then contacting said moving and so supported glass with said polishing means to thereby polish said glass substantially uniformly over its upper entire surface area.

3. In apparatus for polishing glass with a polishing means making surface contact with the glass as the glass moves along a linear path, said polishing means being characterized by a polishing effect which is different in at least one area of glass surface than in other areas of glass surface contact, means to support said glass by its lower surface as it moves along said path with its upper surface disposed for contact by said polishing means, the improvement which comprises means to selectively apply varying forces to an area of said lower surface of said glass opposite to an area of said upper surface in which the polishing effect of said polishing means is different from other areas, said last-named means varying the pressure between said polishing means and said glass in said last-named area so as to polish said glass substantially uniformly over its entire upper surface.

4. Apparatus for polishing glass with a polishing means making contact with the upper glass surface as the glass moves along a linear path, said polishing means being characterized by a polishing effect which is different in at least one area of glass surface contact than in other areas of glass surface contact, which comprises means to support said glass by its lower surface as it moves along said path, said means to support said glass including a table having a supporting surface and means for applying varying forces to said lower glass surface in an area, corresponding to the area of the upper surface in which said polishing effect is different, said means for applying varying forces varying the contact pressure between the polishing means and the glass and thereby providing substantially uniform polishing of the glass over its entire surface.

5. Apparatus as recited in claim 4 wherein said table has a substantially plane surface and said means for applying said varying forces are mounted on said table surface.

6. Apparatus as recited in claim 5 wherein said means for applying varying forces varying the contact pressure table surface includes a shim of inverted pyramidal cross-section.

7. Apparatus as recited in claim 4 wherein said table has a contoured surface of non-planar configuration forming said means to support said glass.

8. The combination of a polishing means and a support for glass during a polishing operation comprising a table having a continuously extending supporting surface, means for applying varying forces varying the contact pressure between said polishing means and a predetermined area of the adjacent glass surface and thereby present a non-planar glass surface for polishing.

9. The combination recited in claim 8 wherein said table has a substantially plane surface and means for applying said varying forces are mounted on said table surface.

10. The combination recited in claim 9 wherein said means for applying said varying forces and mounted on said table surface includes a shim of inverted pyramidal cross-section.

11. The combination recited in claim 8 wherein said table has a contoured surface of non-planar configuration forming said means to support said glass.

12. In the method of polishing planar glass sheets to remove flaws in the surface thereof wherein a polishing means is placed in contact uniformly with a planar surface of said glass sheet and moved thereover as said glass sheet is moved in a longitudinal path to produce a polished surface on said glass sheet characterized by longitudinally extending regions differing from one another in the amount of glass removed by said polishing means; the improvement comprising selectively applying forces to an area of a surface of said glass sheet during longitudinal movement thereof which forces are opposed to said planar surface beneath the region of said planar surface from which the smaller amounts of glass is removed to increase the contact pressure between said polishing means and the regions of said planar surfaces beneath which said forces are applied, continuing to apply said polishing means to said planar surface whereby the amount of glass removed in said regions of smaller glass removal is modified so that a substantially uniform amount of glass is removed from said planar surface in all regions of said planar surface.

13. The combination of a glass polishing means and a table having a substantially level horizontally disposed glass supporting surface and at least one means for applying varying forces varying the contact pressure between said polishing means and an area of said glass sheet mounted on said glass supporting surface and extending longitudinally thereof.

14. In an apparatus for polishing glass comprising means for supporting a glass sheet in a plane, a polishing means adapted to engage a major surface of said glass sheet, and means operably associated with said first-named means for modifying the contour of said glass sheet in a portion of the major surface thereof in contact with said polishing means whereby the contact pressure between the polishing means and the major surface of said glass sheet is varied only in the portion of said surface in which the contour thereof has been modified.

15. In the method of polishing glass comprising supporting a glass sheet in a plane, engaging a major surface of the glass sheet with a polishing means, and modifying the contour of the glass sheet in a portion of its major surface in contact with the polishing means so as to vary the contact pressure between the polishing means and the major surface of the glass sheet in that portion of said surface in which the contour has been modified with respect to another portion of said surface.

16. In the method of polishing glass comprising supporting a glass sheet in a plane, engaging a major surface of said glass sheet with a polishing means so as to apply a first force to said surface, applying a second force to the opposite major surface of said glass sheet in a region thereof approximately opposite the area engaged by said polishing means, relatively adjusting the amounts of said first and second forces so as to vary the contact pressure between portions of said polishing means and the major surface of said glass sheet in contact therewith.

References Cited in the file of this patent
UNITED STATES PATENTS

| | | |
|---|---|---|
| 716,981 | Bagnall | Dec. 30, 1906 |
| 2,667,018 | Dunipace et al. | Jan. 26, 1954 |

UNITED STATES PATENT OFFICE
CERTIFICATE OF CORRECTION

Patent No. 3,066,453                              December 4, 1962

Gerald E. Kunkle et al.

It is hereby certified that error appears in the above numbered patent requiring correction and that the said Letters Patent should read as corrected below.

Column 5, line 21, strike out "for applying varying forces varying the contact pressure" and insert instead -- for applying said varying forces and mounted on said --.

Signed and sealed this 25th day of February 1964.

(SEAL)
Attest:
ERNEST W. SWIDER                              EDWIN L. REYNOLDS

Attesting Officer                                Acting Commissioner of Patents